United States Patent
Hong

(10) Patent No.: US 12,078,540 B2
(45) Date of Patent: Sep. 3, 2024

(54) OPTICAL SENSOR HAVING COMMON LIGHT SENSING CIRCUIT FOR SYNCHRONOUSLY SENSING A PLURALITY OF COLOR LIGHT SIGNALS

(71) Applicant: ANPEC ELECTRONICS CORPORATION, Hsinchu (TW)

(72) Inventor: Jia-Hua Hong, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 82 days.

(21) Appl. No.: 17/979,862

(22) Filed: Nov. 3, 2022

(65) Prior Publication Data

US 2024/0068874 A1 Feb. 29, 2024

(30) Foreign Application Priority Data

Aug. 29, 2022 (TW) .................................. 111132395

(51) Int. Cl.
*G01J 3/50* (2006.01)

(52) U.S. Cl.
CPC ...................... *G01J 3/50* (2013.01)

(58) Field of Classification Search
CPC ..... G01J 3/50; G01J 3/0245; G01J 2001/4406
USPC .......................................... 356/402; 348/300
See application file for complete search history.

(56) References Cited

U.S. PATENT DOCUMENTS

| | | | |
|---|---|---|---|
| 2008/0101802 A1* | 5/2008 | Yano | H03F 3/45475 398/202 |
| 2011/0304757 A1 | 12/2011 | Egawa | |
| 2017/0034888 A1* | 2/2017 | Verma | H05B 47/11 |
| 2018/0262704 A1 | 9/2018 | Xue | |

FOREIGN PATENT DOCUMENTS

| | | |
|---|---|---|
| TW | 201204031 A | 1/2012 |
| TW | 201841496 A | 11/2018 |

* cited by examiner

*Primary Examiner* — Jamares Q Washington
(74) *Attorney, Agent, or Firm* — Li & Cai Intellectual Property (USA) Office

(57) ABSTRACT

An optical sensor having a common light sensing circuit for synchronously sensing a plurality of color light signals is provided. A plurality of photoelectric components respectively convert the plurality of color light signals into a plurality of photocurrents. A plurality of gain amplifiers respectively multiply the plurality of photocurrents by a plurality of gains to output a plurality of amplified photocurrents. An arithmetic circuit adds up the plurality of amplified photocurrents to output a total amplified photocurrent signal. A common analog-to-digital converter converts the total amplified photocurrent signal into a digital signal. A counter circuit counts bit values of the digital signal to output a counting signal.

12 Claims, 11 Drawing Sheets

OPTICAL SENSOR HAVING COMMON LIGHT SENSING CIRCUIT FOR SYNCHRONOUSLY SENSING A PLURALITY OF COLOR LIGHT SIGNALS

CROSS-REFERENCE TO RELATED PATENT APPLICATION

This application claims the benefit of priority to Taiwan Patent Application No. 111132395, filed on Aug. 29, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a light sensing circuit, and more particularly to an optical sensor having a common light sensing circuit for synchronously sensing a plurality of color light signals.

BACKGROUND OF THE DISCLOSURE

If a conventional optical sensor only includes one analog-to-digital converter, the conventional optical sensor cannot sense a plurality of color light signal at the same time. Therefore, the conventional optical sensor alternatively senses the plurality of color light signals, and senses each of the plurality of color light signals multiple times respectively within different time intervals. Time between the time intervals within which each the plurality of color light signals is sensed multiple times is too longer, which results in an error in a light sensed value generated by the conventional optical sensor.

If the conventional optical sensor intends to sense the plurality of color light signals at the same time, the conventional optical sensor must include a plurality of analog-to-digital converters configured to respectively sense the plurality of color light signals. However, the plurality of analog-to-digital converters occupy a large space in the conventional optical sensor, and circuit cost of the conventional optical sensor is increased for the plurality of analog-to-digital converters.

SUMMARY OF THE DISCLOSURE

In response to the above-referenced technical inadequacies, the present disclosure provides an optical sensor having a common light sensing circuit for synchronously sensing a plurality of color light signals. The optical sensor includes a plurality of gain amplifiers, an arithmetic circuit, an analog-to-digital converter circuit and a counter circuit. Input terminals of the plurality of gain amplifiers are respectively connected to a plurality of photoelectric components. The plurality of photoelectric components respectively convert the plurality of color light signals into a plurality of photocurrents. The gain amplifiers amplify the plurality of photocurrents respectively by a plurality of gains to respectively output a plurality of amplified photocurrents. The arithmetic circuit is connected to an output terminal of each of the plurality of gain amplifiers. The arithmetic circuit is configured to add up the plurality of amplified photocurrents to obtain a total amplified photocurrent. The arithmetic circuit is configured to output a total amplified photocurrent signal according to the total amplified photocurrent. The analog-to-digital converter circuit includes one or more common analog-to-digital converters. The common analog-to-digital converters are connected to the arithmetic circuit. Each of the common analog-to-digital converters is configured to convert the total amplified photocurrent into a digital signal. The counter circuit is connected to the analog-to-digital converter circuit. The counter circuit is configured to count bit values of the digital signal to output a counting signal.

In certain embodiments, the plurality of photoelectric components respectively output the plurality of photocurrents in each of a plurality of sensing cycles. The gain amplifiers multiply the plurality of amplified photocurrents respectively by the plurality of gains in each of the plurality of sensing cycles.

In certain embodiments, each of the plurality of photoelectric components converts one of the plurality of color light signals into one of the plurality of photocurrents in each of the plurality of sensing cycles. Each of the plurality of gain amplifiers multiplies the one of the plurality of the photocurrents respectively by different ones of the plurality of gains in the plurality of sensing cycles.

In certain embodiments, the arithmetic circuit performs addition operations of a plurality of equations respectively in the plurality of sensing cycles to calculate the total amplified photocurrent of the plurality of amplified photocurrents of the plurality of color light signals in each of the plurality of sensing cycles. Each of the plurality of equations is represented by:

$$EQm = gi \times CLi + \ldots gj \times CLj,$$

wherein EQm represents the total amplified photocurrent of an mth one of the plurality of equations, j is an integer value being larger than or equal to 2, gi to gj respectively represent an ith one of the gains to an jth one of the gains, and CLi to CLj respectively represent an ith one of the plurality of photocurrents to an jth one of the plurality of photocurrents.

In certain embodiments, the counter circuit is connected to a color light value calculator circuit. The color light value calculator circuit is configured to substitute the total amplified photocurrent of each of the plurality of sensing cycles into one of the plurality of equations according to the counting signal. The color light value calculator circuit is configured to subtract the plurality of equations from each other to calculate the photocurrent of each of the plurality of color light signals.

In certain embodiments, the arithmetic circuit includes one or more arithmetic operators. A number of the arithmetic operators is equal to a number of the common analog-to-digital converters. If the number of the arithmetic operators is larger than one, each of a plurality of light sensing circuits includes some of the plurality of gain amplifiers, one of the plurality of arithmetic operators and one of the plurality of common analog-to-digital converters. In each of the plurality of light sensing circuits, an output terminal of each of the plurality of gain amplifiers is connected to an input terminal of the arithmetic operator. In each of the plurality of light sensing circuits, an output terminal of the arithmetic operator is connected to an input terminal of the common analog-to-digital converter. In each of the plurality of light sensing circuits, the arithmetic operator adds up the amplified photocurrents that are respectively outputted by some of the plurality of gain amplifiers to output the total amplified photocurrent signal to the common analog-to-digital converter.

In certain embodiments, the counter circuit includes one or more counters. A number of the counters is equal to the number of the common analog-to-digital converters. If the number of the counters is larger than one, the counters are respectively connected to the common analog-to-digital converters. If the number of the counters is larger than one, each of a plurality of light sensing circuits includes some of the plurality of gain amplifiers, one of the plurality of counters and one of the plurality of common analog-to-digital converters. In each of the plurality of light sensing circuits, the counter counts the digital signal from the one of the plurality of common analog-to-digital converter to output the counting signal.

In certain embodiments, the optical sensor further includes one or more multiplexers. A number of the multiplexers is equal to the number of the counters. If the number of the multiplexers is larger than one, the multiplexers are respectively connected to the counters, and each of the plurality of light sensing circuits further includes one of the plurality of multiplexers. In each of the plurality of light sensing circuits, the counter counts the bit values of the digital signal from the analog-to-digital converter to output the counting signal in each of a plurality of sensing cycles. In each of the plurality of light sensing circuits, the multiplexer selects one of the counting signals that are respectively outputted in the plurality of sensing cycles, and transmits the one of the counting signals from the counter to a color light value calculator circuit. In each of the plurality of light sensing circuits, the color light value calculator circuit calculates light intensity of the plurality of color light signals according to the counting signal from the multiplexer.

In certain embodiments, the optical sensor further includes a control circuit. The control circuit is connected to the one or more multiplexers. The control circuit is configured to control the one or more multiplexers to operate.

In certain embodiments, the optical sensor further includes a storing circuit. The storing circuit is connected to the counter circuit. The storing circuit is configured to store the counting signal from the counter circuit.

In certain embodiments, each of the common analog-to-digital converters includes a comparator. A first input terminal of the comparator is connected to an output terminal of the arithmetic circuit. A second input terminal of the comparator is coupled to a reference voltage. An output terminal of the comparator is connected to the counter circuit. The comparator compares the reference voltage with a voltage converted from the total amplified photocurrent of the total amplified photocurrent signal to output the digital signal to the counter circuit.

In certain embodiments, each of the common analog-to-digital converters further includes a capacitor. A first terminal of the capacitor is connected to the arithmetic circuit and the first input terminal of the comparator. A second terminal of the capacitor is grounded. The arithmetic circuit outputs the total amplified photocurrent signal to the capacitor to charge the capacitor. The comparator compares a voltage of the capacitor with the reference voltage to output the digital signal.

In certain embodiments, each of the common analog-to-digital converters further includes a switch component. A first terminal of the switch component is connected to the first input terminal of the comparator. A second terminal of the switch component is grounded. A control terminal of the switch component is connected to the output terminal of the comparator.

As described above, the present disclosure provides the optical sensor having the common light sensing circuit for synchronously sensing the plurality of color light signals. The (common analog-to-digital converter of the) common light sensing circuit of the present disclosure is capable of continually sensing each of the plurality of color light signals in the plurality of sensing cycles. Therefore, an error is prevented from occurring in the sensed color light signals due to the sensed color light signals change with a change in a surrounding environment over time. It is worth noting that, the (common analog-to-digital converter of the) common light sensing circuit of the present disclosure is capable of synchronously sensing the plurality of color light signals in each of the plurality of sensing cycles. Therefore, a space occupied by the analog-to-digital converter circuit in the optical sensor and costs of the analog-to-digital converter circuit are reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
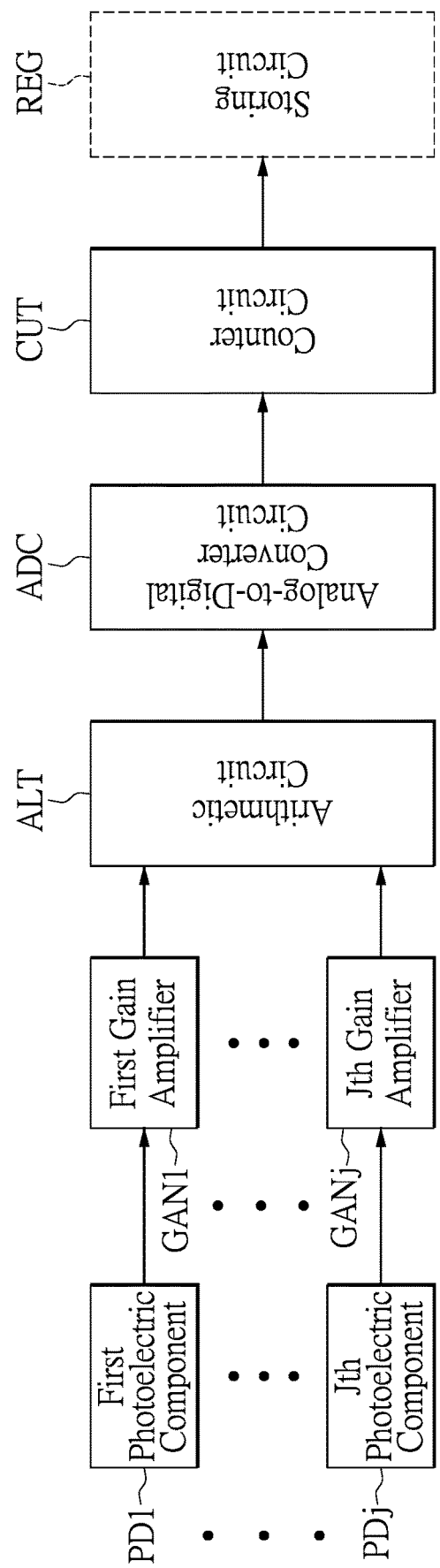
FIG. 1 is a block diagram of an optical sensor having a common light sensing circuit for synchronously sensing a plurality of color light signals according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of an optical sensor having a common light sensing circuit for synchronously sensing a plurality of color light signals according to a first embodiment of the present disclosure.

The common light sensing circuit of the optical sensor of the present disclosure is applicable to synchronously sense the plurality of color light signals emitted by a plurality of light sources in each of a plurality of sensing cycles, and sense each of the plurality of color light signals respectively in the plurality of sensing cycles.

The common light sensing circuit of the optical sensor of the present disclosure may include a plurality of gain amplifiers such as first to jth gain amplifiers GAN1 to GANj, an arithmetic circuit ALT, an analog-to-digital converter circuit ADC and a counter circuit CUT as shown in FIG. 1. A number of the first to jth gain amplifiers GAN1 to GANj is an integer value being larger than or equal to two. If necessary, the common light sensing circuit of the optical sensor of the present disclosure may further include a storing circuit REG.

Input terminals of the first to jth gain amplifiers GAN1 to GANj are respectively connected to first to jth photoelectric components PD1 to PDj. An output terminal of each of the first to jth gain amplifiers GAN1 to GANj is connected to the arithmetic circuit ALT. The analog-to-digital converter circuit ADC includes at least one common analog-to-digital converter that is connected to the arithmetic circuit ALT and the counter circuit CUT. The counter circuit CUT is connected to the storing circuit REG.

First, the plurality of photoelectric components PD1 to PDj respectively convert the plurality of color light signals into a plurality of photocurrents. The photoelectric components PD1 to PDj multiply the plurality of photocurrents respectively by a plurality of gains to respectively output a plurality of amplified photocurrents to the arithmetic circuit ALT. The arithmetic circuit ALT adds up the plurality of amplified photocurrents to obtain a total amplified photocurrent. The arithmetic circuit ALT outputs a total amplified photocurrent signal according to the total amplified photocurrent.

The arithmetic circuit ALT performs addition operations of a plurality of equations respectively in the plurality of sensing cycles to calculate the total amplified photocurrent of the plurality of amplified photocurrents of the plurality of color light signals in each of the plurality of sensing cycles. The equation is represented by:

$$EQm = gi \times CLi + \ldots gj \times CLj,$$

wherein EQm represents the total amplified photocurrent of an mth one of the plurality of equations, j is an integer value being larger than or equal to 2, gi to gj respectively represent an ith one of the gains to an jth one of the gains, and CLi to CLj respectively represent an ith one of the plurality of photocurrents to an jth one of the plurality of photocurrents.

The analog-to-digital converter circuit ADC receives the total amplified photocurrent from the arithmetic circuit ALT, and converts the total amplified photocurrent that is an analog signal into a digital signal. The counter circuit CUT counts bit values such as "1" of the digital signal to output a counting signal. The storing circuit REG may store the counting signal. A value of the counting signal represents the total amplified photocurrent of the plurality of color light signals that is sensed by the optical sensor of the embodiment of the present disclosure.

If necessary, the counter circuit CUT may be connected to a color light value calculator circuit that is included in the optical sensor of the embodiment of the present disclosure or is included in an external circuit. The color light value calculator circuit may substitute the total amplified photocurrents of the plurality of sensing cycles respectively into the plurality of equations. Then, the color light value calculator circuit may subtract the plurality of equations from each other to calculate the photocurrent of each of the plurality of color light signals.

Figure 2:
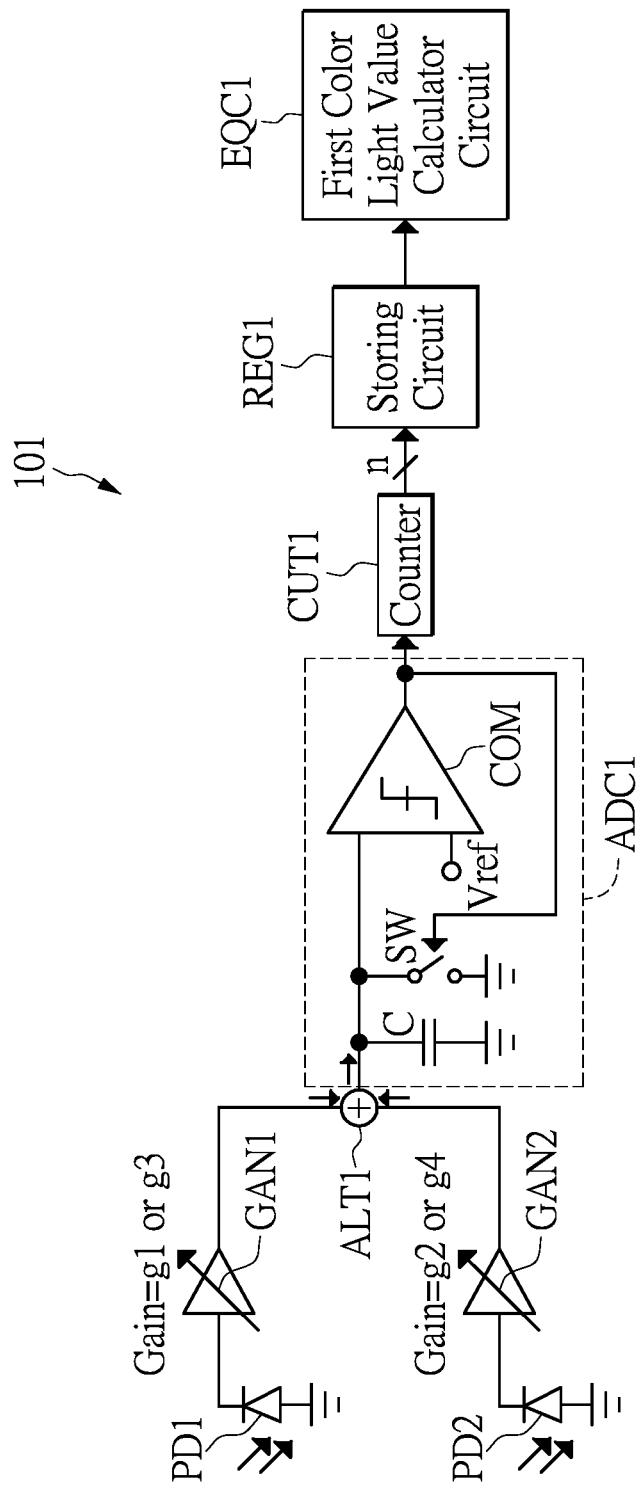
FIG. 2 is a circuit diagram of an optical sensor having a common light sensing circuit for synchronously sensing a plurality of color light signals according to a second embodiment of the present disclosure.
Figure 3:
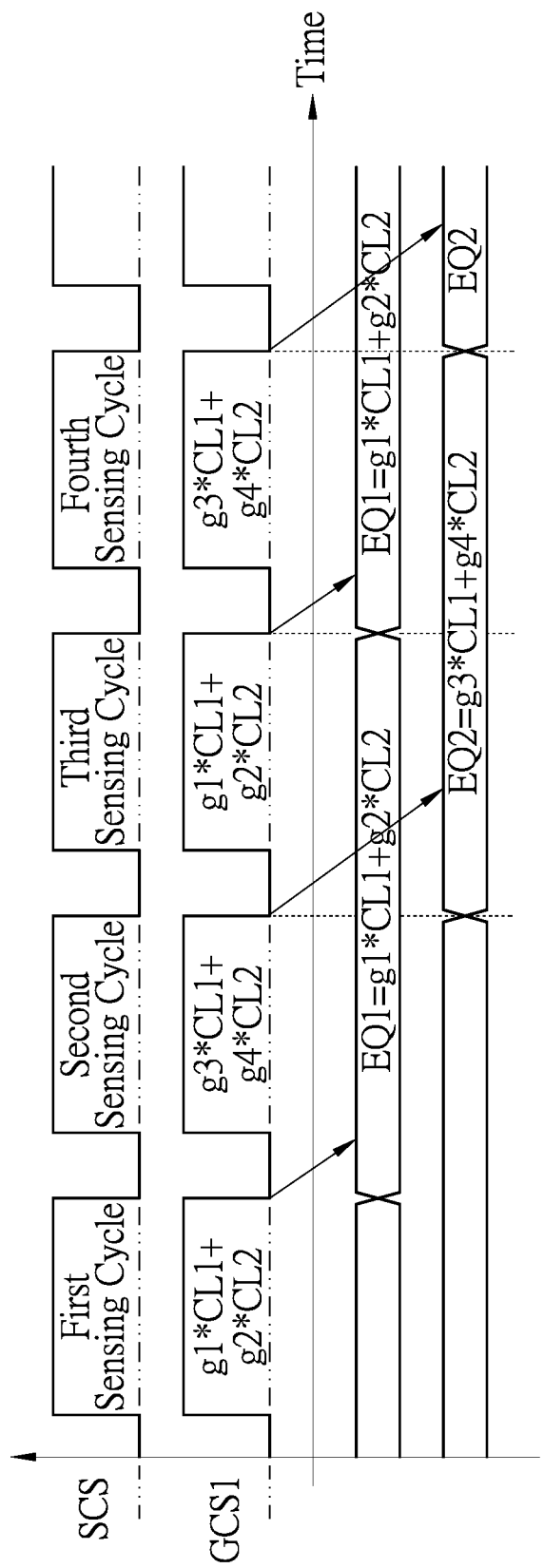
FIG. 3 is a waveform diagram of signals of the optical sensor having the common light sensing circuit for synchronously sensing the plurality of color light signals according to the second embodiment of the present disclosure.

Reference is made to FIGS. 2 and 3, in which FIG. 2 is a circuit diagram of an optical sensor having a common light sensing circuit for synchronously sensing a plurality of color light signals according to a second embodiment of the present disclosure, and FIG. 3 is a waveform diagram of signals of the optical sensor having the common light sensing circuit for synchronously sensing the plurality of color light signals according to the second embodiment of the present disclosure.

The common light sensing circuit of the optical sensor of the embodiment of the present disclosure includes a first light sensing circuit 101 as shown in FIG. 2. The first light sensing circuit 101 includes the first gain amplifier GAN1, the second gain amplifier GAN2, an arithmetic circuit including an arithmetic operator ALT1, a common analogto-digital converter circuit including a common analog-to-digital converter ADC1, a counter circuit including a counter CUT1, and a first color light value calculator circuit EQC1. If necessary, the first light sensing circuit 101 may further include the storing circuit REG such as a register.

An input terminal of the first gain amplifier GAN1 is connected to a cathode of the first photoelectric component PD1. An input terminal of the second gain amplifier GAN2 is connected to a cathode of the second photoelectric component PD2. An anode of the first photoelectric component PD1 and an anode of the second photoelectric component PD2 are grounded.

An output terminal of the first gain amplifier GAN1 and an output terminal of the second gain amplifier GAN2 are connected to an input terminal of the arithmetic operator ALT1. An output terminal of the arithmetic operator ALT1 is connected to an input terminal of the common analog-to-digital converter ADC1. An output terminal of the common analog-to-digital converter ADC1 is connected to an input terminal of the counter CUT1. An output terminal of the counter CUT1 is connected to an input terminal of the storing circuit REG. An output terminal of the storing circuit REG (or the output terminal of the counter CUT1) is connected to an input terminal of the first color light value calculator circuit EQC1.

For example, the common analog-to-digital converter ADC1 may include a comparator COM, a capacitor C and a switch component SW. A first input terminal of the comparator COM is connected to an input terminal of the arithmetic operator ALT1. A second input terminal of the comparator COM is coupled to a reference voltage Vref. An output terminal of the comparator COM is connected to the input terminal of the counter CUT1 and a control terminal of the switch component SW.

In each of the plurality of sensing cycles as shown in a sensing cycle signal SCS of FIG. 3, the first photoelectric component PD1 shown in FIG. 1 converts a first color light signal into a first photocurrent CL1 as shown in a first arithmetic signal GCS1 of FIG. 3. At the same time, the second photoelectric component PD2 converts a second color light signal into a second photocurrent CL2 of the first arithmetic signal GCS1 as shown in FIG. 3.

Gains of all of the plurality of gain amplifiers GAN1 to GANj are variable gains as described herein. Each of the plurality of gain amplifiers GAN1 to GANj multiply one of the plurality of photocurrents by different ones of the plurality of gains respectively in the plurality of sensing cycles as described in detail in the following.

In the first sensing cycle among the plurality of sensing cycles of the sensing cycle signal SCS as shown in FIG. 3, the first gain amplifier GAN1 multiplies the first photocurrent CL1 by a first gain g1 as shown in the first arithmetic signal GCS1 of FIG. 3 to output an amplified photocurrent. In the first sensing cycle, the second gain amplifier GAN2 multiplies the second photocurrent CL2 by a second gain g2 as shown in the first arithmetic signal GCS1 of FIG. 3 to output an amplified photocurrent.

In the first sensing cycle, the arithmetic circuit ALT1 of the first light sensing circuit 101 performs an addition operation of a first equation as shown in FIG. 3 to add up the amplified photocurrent that is equal to the first photocurrent CL1 multiplied by the first gain g1 and the amplified photocurrent that is equal to the second photocurrent CL2 multiplied by the second gain g2 to obtain the total amplified photocurrent EQ1. The first equation is represented by:

$$EQ1 = g1 \times CL1 + g2 \times CL2,$$

wherein EQ1 represents the total amplified photocurrent of the first equation generated by the first light sensing circuit 101, g1 represents the first gain, g2 represents the second gain, CL1 represents the first photocurrent, and CL2 represents the second photocurrent.

The arithmetic circuit ALT1 of the first light sensing circuit 101 outputs the total amplified photocurrent signal according to the total amplified photocurrent EQ1 of the first equation.

Then, in the first sensing cycle, the comparator COM compares a voltage of the capacitor C that is charged by the total amplified photocurrent of the total amplified photocurrent signal of the first equation from the arithmetic circuit ALT with the reference voltage Vref to output a first comparison signal. The counter CUT1 counts a (high) level of the first comparison signal to output a first counting signal. A value of the first counting signal represents the total amplified photocurrent EQ1 of the first and second color light signals of the two light sources sensed in the first sensing cycle.

If necessary, the storing circuit REG1 may store the first counting signal.

After the comparator COM outputs the first comparison signal, the switch component SW may be turned on according to the first comparison signal (at the high level). As a result, a voltage of the first input terminal of the comparator COM is reset to a zero voltage through the switch component SW being turned on.

In a second sensing cycle among the plurality of sensing cycles of the sensing cycle signal SCS as shown in FIG. 3, the first gain amplifier GAN1 multiplies the first photocurrent CL1 of the first photoelectric component PD1 by a third gain g3 as shown in the first arithmetic signal GCS1 of FIG. 3 to output an amplified photocurrent. In the second sensing cycle, the second gain amplifier GAN2 multiplies the second photocurrent CL2 of the second photoelectric component PD2 by a fourth gain g4 as shown in the first arithmetic signal GCS1 of FIG. 3 to output an amplified photocurrent.

Then, in the second sensing cycle, the arithmetic circuit ALT1 of the first light sensing circuit 101 performs an addition operation of a second equation as shown in FIG. 3 to add up the amplified photocurrent that is equal to the first photocurrent CL1 multiplied by the third gain g3 and the amplified photocurrent that is equal to the second photocurrent CL2 multiplied by the fourth gain g4 to obtain the total amplified photocurrent EQ2. The first equation is represented by:

$$EQ2 = g3 \times CL1 + g4 \times CL2,$$

wherein EQ2 represents the total amplified photocurrent of the second equation generated by the first light sensing circuit 101, g3 represents the third gain, g4 represents the fourth gain, CL1 represents the first photocurrent, and CL2 represents the second photocurrent.

The arithmetic circuit ALT1 of the first light sensing circuit 101 outputs the total amplified photocurrent signal according to the total amplified photocurrent EQ2 of the second equation.

Then, in the second sensing cycle, the comparator COM compares the voltage of the capacitor C that is charged by the total amplified photocurrent of the total amplified photocurrent signal of the second equation from the arithmetic circuit ALT1 with the reference voltage Vref to output a second comparison signal. The counter CUT1 counts a (high) level of the second comparison signal to output a second counting signal. A value of the second counting signal represents the total amplified photocurrent of the total amplified photocurrent signal of the two color light signals of the two light sources sensed in the second sensing cycle.

If necessary, the storing circuit REG1 may store the second counting signal.

If the photocurrent of each of the color light signals needs to be calculated, the storing circuit REG1 or the counter CUT1 may be connected to the first color light value calculator circuit EQC1 that is included in the first light sensing circuit 101 of the optical sensor of the embodiment of the present disclosure or is included in the external circuit.

The first color light value calculator circuit EQC1 may substitute the total amplified photocurrent EQ1 represented by the value of the first counting signal into the first equation. The first color light value calculator circuit EQC1 may substitute the total amplified photocurrent EQ2 represented by the value of the second counting signal into the second equation. Then, the first color light value calculator circuit EQC1 may subtract the first equation from the second equation to calculate each of the first photocurrent CL1 of the first color light signal and the second photocurrent CL2 of the second color light signal. Finally, the first color light value calculator circuit EQC1 may calculate light intensity of the first color light signal according to the first photocurrent CL1, and may calculate light intensity of the second color light signal according to the second photocurrent CL2.

If necessary, the above-mentioned operations may also be performed in others of the plurality of sensing cycles of the sensing cycle signal SCS as shown in FIG. 3.

Figure 4:
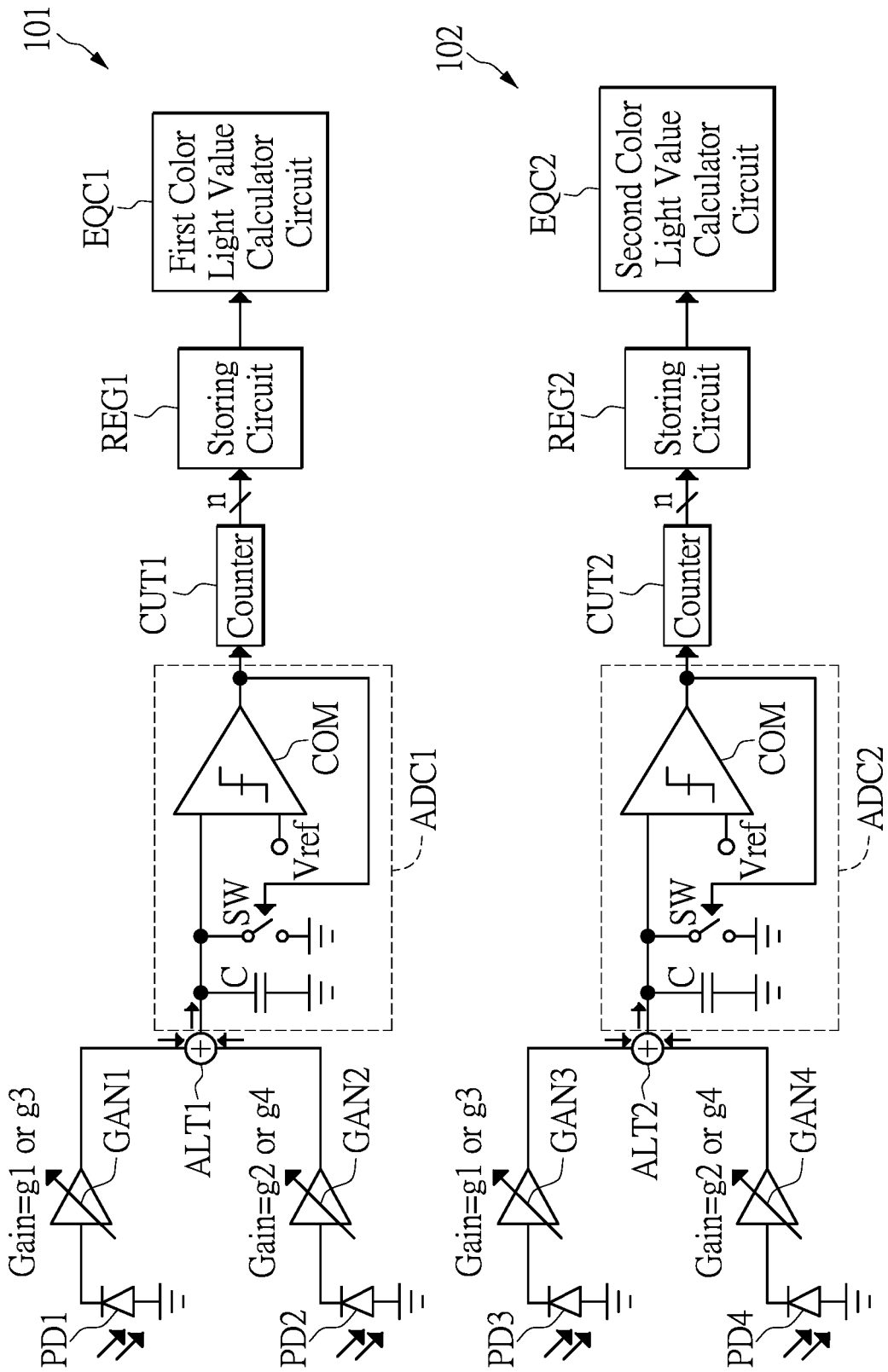
FIG. 4 is a circuit diagram of an optical sensor having a common light sensing circuit for synchronously sensing a plurality of color light signals according to a third embodiment of the present disclosure.
Figure 5:
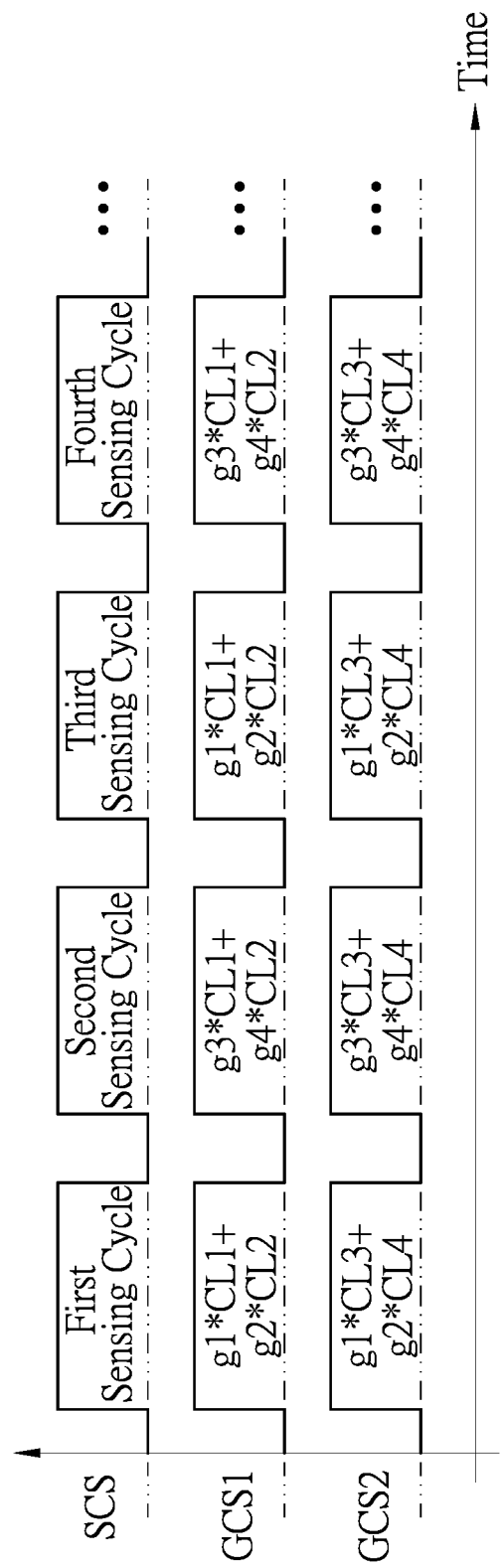
FIG. 5 is a waveform diagram of signals of the optical sensor having the common light sensing circuit for synchronously sensing the plurality of color light signals according to the third embodiment of the present disclosure.

Reference is made to FIGS. 4 and 5, in which FIG. 4 is a circuit diagram of an optical sensor having a common light sensing circuit for synchronously sensing a plurality of color light signals according to a third embodiment of the present disclosure, and FIG. 5 is a waveform diagram of signals of the optical sensor having the common light sensing circuit for synchronously sensing the plurality of color light signals according to the third embodiment of the present disclosure.

The first light sensing circuit 101 of the third embodiment is the same as that of the second embodiment and thus is not repeated herein. A difference between the third and second embodiments is that, the common light sensing circuit of the optical sensor of the third embodiment of the present disclosure further includes a second light sensing circuit 102 as shown in FIG. 4.

A third gain amplifier GAN3, a fourth gain amplifier GAN4, an arithmetic operator ALT2, a common analog-to-digital converter ADC2, a counter CUT2 and a storing circuit REG2 that are included in the second light sensing circuit 102 are respectively the same as the first gain amplifier GAN1, the second gain amplifier GAN2, the arithmetic operator ALT1, the common analog-to-digital converter ADC1, the counter CUT1 and the storing circuit REG1 that are included in the first light sensing circuit 101.

The second light sensing circuit 102 performs operations that are substantially the same as that of the first light sensing circuit 101. A difference between the second light sensing circuit 102 and the first light sensing circuit 101 is that, the second light sensing circuit 102 and the first light sensing circuit 101 sense different color light signals.

A third photoelectric component PD3 converts a third color light signal into a third photocurrent CL3 as shown in a second arithmetic signal GCS2 of FIG. 5. A fourth photoelectric component PD4 converts a fourth color light signal into a fourth photocurrent CL4 as shown in the second arithmetic signal GCS2 of FIG. 5. The second light sensing circuit 102 senses the third photocurrent CL3 and the fourth photocurrent CL4 at the same time.

In the embodiment, the fourth color light signal, the third color light signal, the second light signal and the first color light signal are four different light signals (having different colors, light intensities or wavelengths).

In the first sensing cycle among the plurality of sensing cycles of the sensing cycle signal SCS as shown in FIG. 5, the third gain amplifier GAN3 of the second light sensing circuit 102 multiplies the third photocurrent CL3 by the first gain g1 to output an amplified photocurrent. In the first sensing cycle, the fourth gain amplifier GAN4 of the second light sensing circuit 102 multiplies the fourth photocurrent CL4 by the second gain g2 to output an amplified photocurrent.

In the first sensing cycle, the arithmetic circuit ALT2 of the second light sensing circuit 102 performs an addition operation of the second arithmetic signal GCS2 as shown in FIG. 5 to output the total amplified photocurrent signal. That is, the arithmetic circuit ALT2 of the second light sensing circuit 102 performs the addition operation of the following first equation:

$$EQ1 = g1 \times CL3 + g2 \times CL4,$$

wherein EQ1 represents the total amplified photocurrent of the first equation generated by the second light sensing circuit 102, g1 represents the first gain, g2 represents the second gain, CL3 represents the third photocurrent, and CL4 represents the fourth photocurrent.

In the second sensing cycle among the plurality of sensing cycles of the sensing cycle signal SCS as shown in FIG. 5, the third gain amplifier GAN3 of the second light sensing circuit 102 multiplies the third photocurrent CL3 by the third gain g3 to output an amplified photocurrent. In the second sensing cycle, the fourth gain amplifier GAN4 of the second light sensing circuit 102 multiplies the fourth photocurrent CL4 by the fourth gain g4 to output an amplified photocurrent.

In the second sensing cycle, the arithmetic circuit ALT2 of the second light sensing circuit 102 performs an addition operation of the second arithmetic signal GCS2 as shown in FIG. 5 to output the total amplified photocurrent signal. That is, the arithmetic circuit ALT2 of the second light sensing circuit 102 performs the addition operation of the following second equation:

$$EQ2 = g3 \times CL3 + g4 \times CL4,$$

wherein EQ2 represents the total amplified photocurrent of the second equation generated by the second light sensing circuit 102, g3 represents the third gain, g4 represents the fourth gain, CL3 represents the third photocurrent, and CL4 represents the fourth photocurrent.

In the first sensing cycle, the comparator COM of the common analog-to-digital converter ADC compares a voltage converted from the total amplified photocurrent EQ1 of the first equation (that is the voltage of the capacitor C being charged by the total amplified photocurrent EQ1) with the reference voltage Vref to output a first digital signal. The counter CUT2 counts the first digital signal to output the first counting signal. In the second sensing cycle, the comparator COM of the common analog-to-digital converter ADC compares a voltage converted from the total amplified photocurrent EQ2 of the second equation (that is the voltage of the capacitor C being charged by the total amplified photocurrent EQ2) with the reference voltage Vref to output a second digital signal. The counter CUT2 counts the second digital signal to output the second counting signal.

The second color light value calculator circuit EQC2 substitutes the total amplified photocurrent EQ1 represented by the first counting signal into the first equation. The second color light value calculator circuit EQC2 substitutes the total amplified photocurrent EQ2 represented by the second counting signal into the second equation. The second color light value calculator circuit EQC2 subtracts the first equation from the second equation to calculate each of the third photocurrent CL3 of the third color light signal and the fourth photocurrent CL4 of the fourth color light signal. The second color light value calculator circuit EQC2 may further calculate light intensity of the third color light signal according to the third photocurrent CL3, and may calculate light intensity of the fourth color light signal according to the fourth photocurrent CL4.

Figure 6:
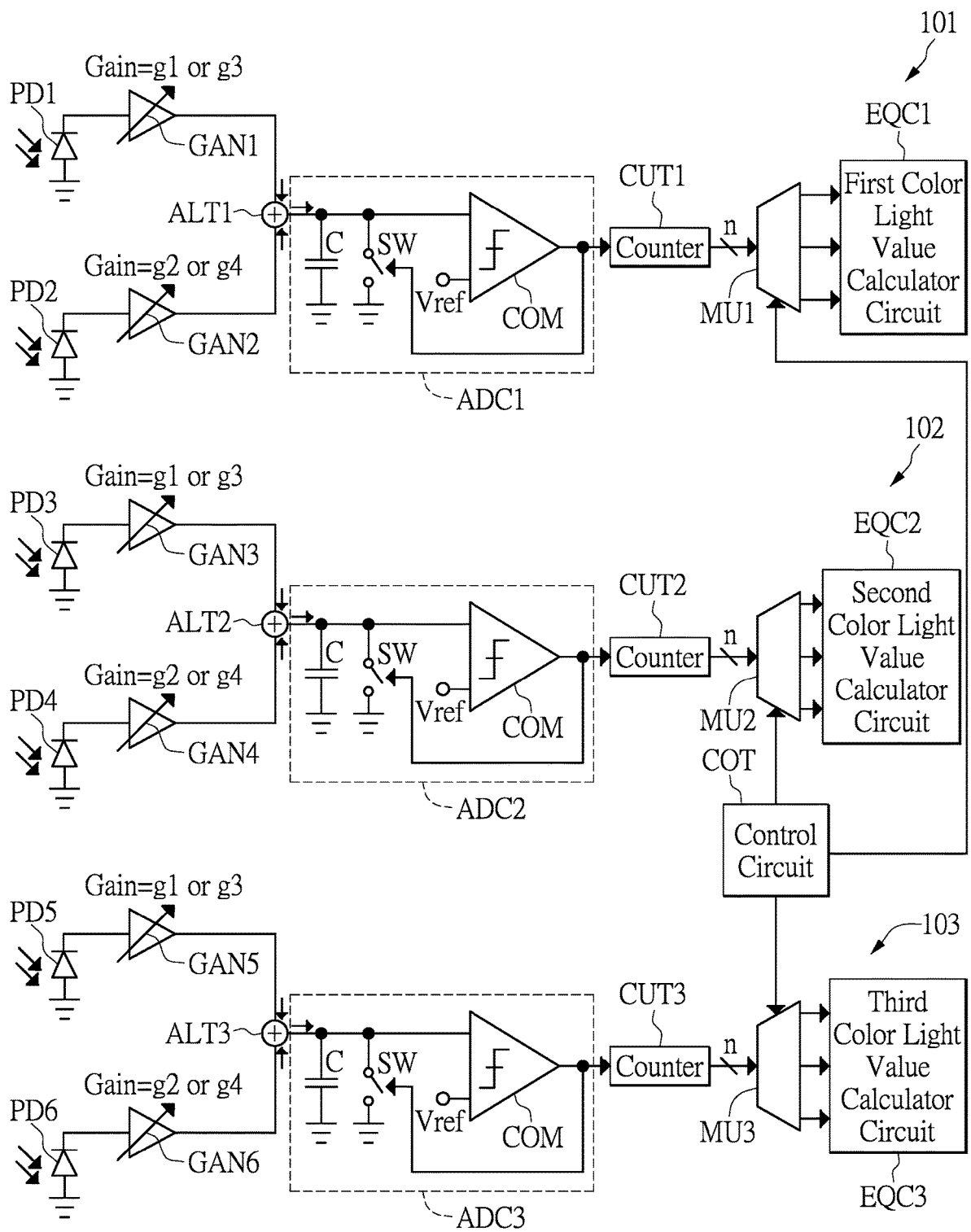
FIG. 6 is a circuit diagram of an optical sensor having a common light sensing circuit for synchronously sensing a plurality of color light signals according to a fourth embodiment of the present disclosure.
Figure 7:
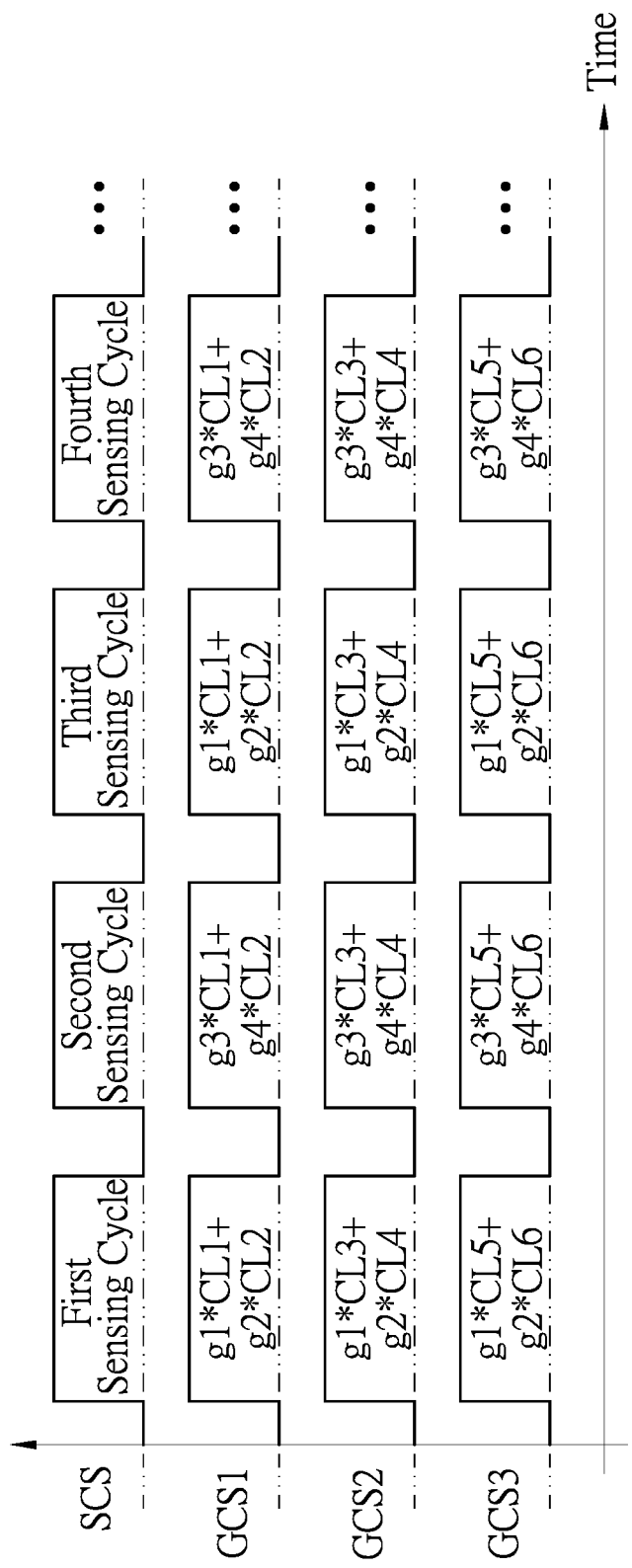
FIG. 7 is a waveform diagram of signals of the optical sensor having the common light sensing circuit for synchronously sensing the plurality of color light signals according to the fourth embodiment of the present disclosure.

Reference is made to FIGS. 6 and 7, in which FIG. 6 is a circuit diagram of an optical sensor having a common light sensing circuit for synchronously sensing a plurality of color light signals according to a fourth embodiment of the present disclosure, and FIG. 7 is a waveform diagram of signals of the optical sensor having the common light sensing circuit for synchronously sensing the plurality of color light signals according to the fourth embodiment of the present disclosure.

The common light sensing circuit of the optical sensor of the present disclosure may include one or more light sensing circuits. As shown in FIG. 2, the common light sensing circuit only includes the first light sensing circuit 101. As shown in FIG. 4, the common light sensing circuit includes the first light sensing circuit 101 and the second light sensing circuit 102. As shown in FIG. 6, the common light sensing circuit only includes the first light sensing circuit 101, the second light sensing circuit 102 and a third light sensing circuit 103. In practice, the common light sensing circuit of the optical sensor of the present disclosure may include more light sensing circuits.

A fifth gain amplifier GAN5, a sixth gain amplifier GAN6, an arithmetic operator ALT3, a common analog-to-digital converter ADC3, a counter CUT3 and a third color light value calculator circuit EQC3 that are included in the third light sensing circuit 103 as shown in FIG. 6 are respectively the same as the third gain amplifier GAN3, the fourth gain amplifier GAN4, the arithmetic operator ALT2, the common analog-to-digital converter ADC2, the counter CUT2 and the second light sensing circuit EQC2 that are included in the second light sensing circuit 102. The same descriptions are not repeated herein.

A fifth photoelectric component PD5 converts a fifth color light into a fifth photocurrent CL5 as shown in a third arithmetic signal GCS3 of FIG. 7. A sixth photoelectric component PD6 converts a sixth color light into a sixth photocurrent CL6 as shown in the third arithmetic signal GCS3 of FIG. 7. The third light sensing circuit 103 senses the fifth photocurrent CL5 and the sixth photocurrent CL6 at the same time.

In the embodiment, the sixth color light signal, the fifth color light signal, the fourth color light signal, the third color light signal, the second light signal and the first color light signal are six different light signals.

In the first sensing cycle among the plurality of sensing cycles of the sensing cycle signal SCS as shown in FIG. 7, the fifth gain amplifier GAN5 of the third light sensing circuit 103 multiplies the fifth photocurrent CL5 by the first gain g1 as shown in the third arithmetic signal GCS3 as shown in FIG. 7 to output an amplified photocurrent. In the first sensing cycle, the sixth gain amplifier GAN6 of the third light sensing circuit 103 multiplies the sixth photocurrent CL6 by the second gain g2 as shown in the third arithmetic signal GCS3 of FIG. 7 to output an amplified photocurrent.

In the first sensing cycle, the arithmetic operator ALT3 of the third light sensing circuit 103 performs an addition operation of the third arithmetic signal GCS3 as shown in FIG. 7 to output the total amplified photocurrent signal. That is, the arithmetic operator ALT3 of the third light sensing circuit 103 performs the addition operation of the following first equation:

$EQ1 = g1 \times CL5 + g2 \times CL6$, wherein EQ1 represents the total amplified photocurrent of the first equation generated by the third light sensing circuit 103, g1 represents the first gain, g2 represents the second gain, CL5 represents the fifth photocurrent, and CL6 represents the sixth photocurrent.

In the second sensing cycle among the plurality of sensing cycles of the sensing cycle signal SCS as shown in FIG. 7, the fifth gain amplifier GAN5 of the third light sensing circuit 103 multiplies the fifth photocurrent CL5 by the third gain g3 as shown in the third arithmetic signal GCS3 of FIG. 7 to output an amplified photocurrent. In the second sensing cycle, the sixth gain amplifier GAN6 of the third light sensing circuit 103 multiplies the sixth photocurrent CL6 by the fourth gain g4 as shown in the third arithmetic signal GCS3 of FIG. 7 to output an amplified photocurrent.

In the second sensing cycle, the arithmetic operator ALT3 of the third light sensing circuit 103 performs an addition operation of the third arithmetic signal GCS3 as shown in FIG. 7 to output the total amplified photocurrent signal. That is, the arithmetic operator ALT3 of the third light sensing circuit 103 performs the addition operation of the following second equation:

$EQ2 = g3 \times CL5 + g4 \times CL6$, wherein EQ2 represents the total amplified photocurrent of the second equation generated by the third light sensing circuit 103, g3 represents the third gain, g4 represents the fourth gain, CL5 represents the fifth photocurrent, and CL6 represents the sixth photocurrent.

The third color light value calculator circuit EQC3 may subtract the first equation from the second equation to calculate each of the fifth photocurrent CL5 of the fifth color light signal and the sixth photocurrent CL6 of the sixth color light signal. The third color light value calculator circuit EQC3 may further calculate light intensity of the fifth color light signal according to the fifth photocurrent CL5, and may calculate light intensity of the sixth color light signal according to the sixth photocurrent CL6.

In addition, the common light sensing circuit of the embodiment of the present disclosure further includes a control circuit COT, and a plurality of multiplexers such as a multiplexer MU1 of the first light sensing circuit 101, a multiplexer MU2 of the second light sensing circuit 102 and a multiplexer MU3 of the third light sensing circuit 103.

The multiplexer MU1 is connected to the counter CUT1, the first color light value calculator circuit EQC1 and the control circuit COT. The control circuit COT may control the multiplexer MU1 to select one of the counting signals (such as n counting signals as shown in FIG. 6) from the counter CUT1, and to transmit the one of the counting signals from the counter CUT1 to the first color light value calculator circuit EQC1.

The multiplexer MU2 is connected to the counter CUT2, the second color light value calculator circuit EQC2 and the control circuit COT. The control circuit COT may control the multiplexer MU2 to select one of the counting signals from the counter CUT2, and to transmit the one of the counting signals from the counter CUT2 to the second color light value calculator circuit EQC2.

The multiplexer MU3 is connected to the counter CUT3, the third color light value calculator circuit EQC3 and the control circuit COT. The control circuit COT may control the multiplexer MU3 to select one of the counting signals from the counter CUT3, and to transmit the one of the counting signals from the counter CUT3 to the third color light value calculator circuit EQC3.

In practice, the first color light value calculator circuit EQC1, the second color light value calculator circuit EQC2 and the third color light value calculator circuit EQC3 may be replaced with a single color light value calculator circuit.

As described above, in each of the second to fourth embodiments, each of the light sensing circuits includes the two photoelectric components configured to respectively sense the two color light signals, but the present disclosure is not limited thereto. In practice, each of the light sensing circuits may include more photoelectric components configured to sense more color light signals.

Figure 8:
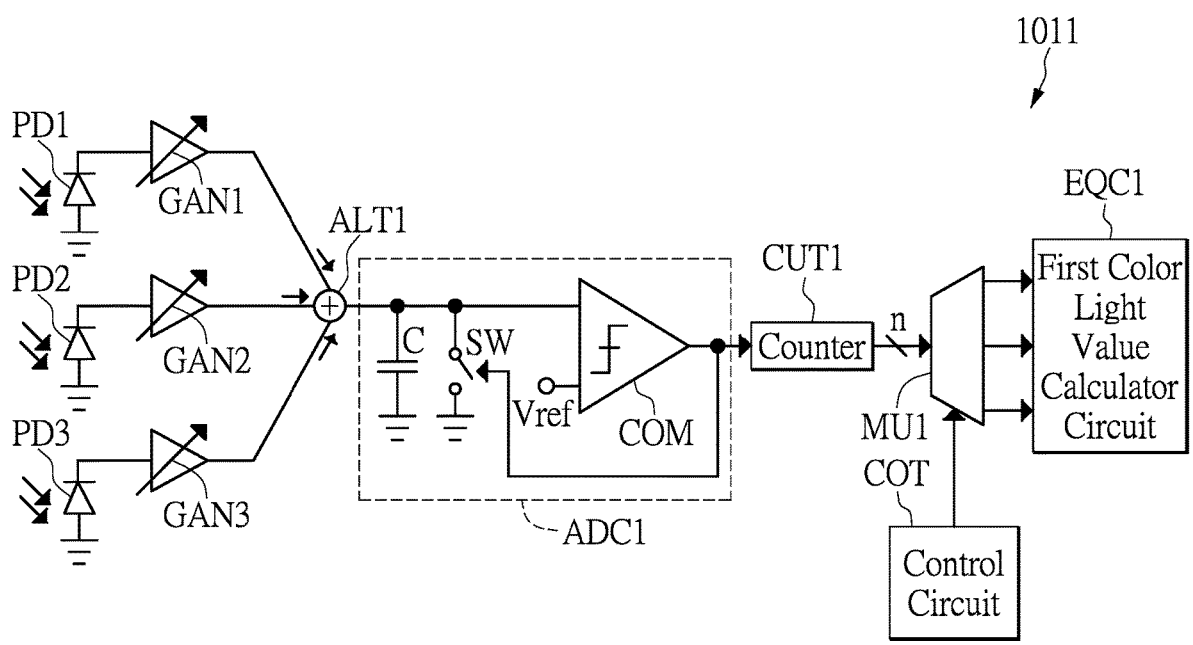
FIG. 8 is a circuit diagram of an optical sensor having a common light sensing circuit for synchronously sensing a plurality of color light signals according to a fifth embodiment of the present disclosure.
Figure 9:
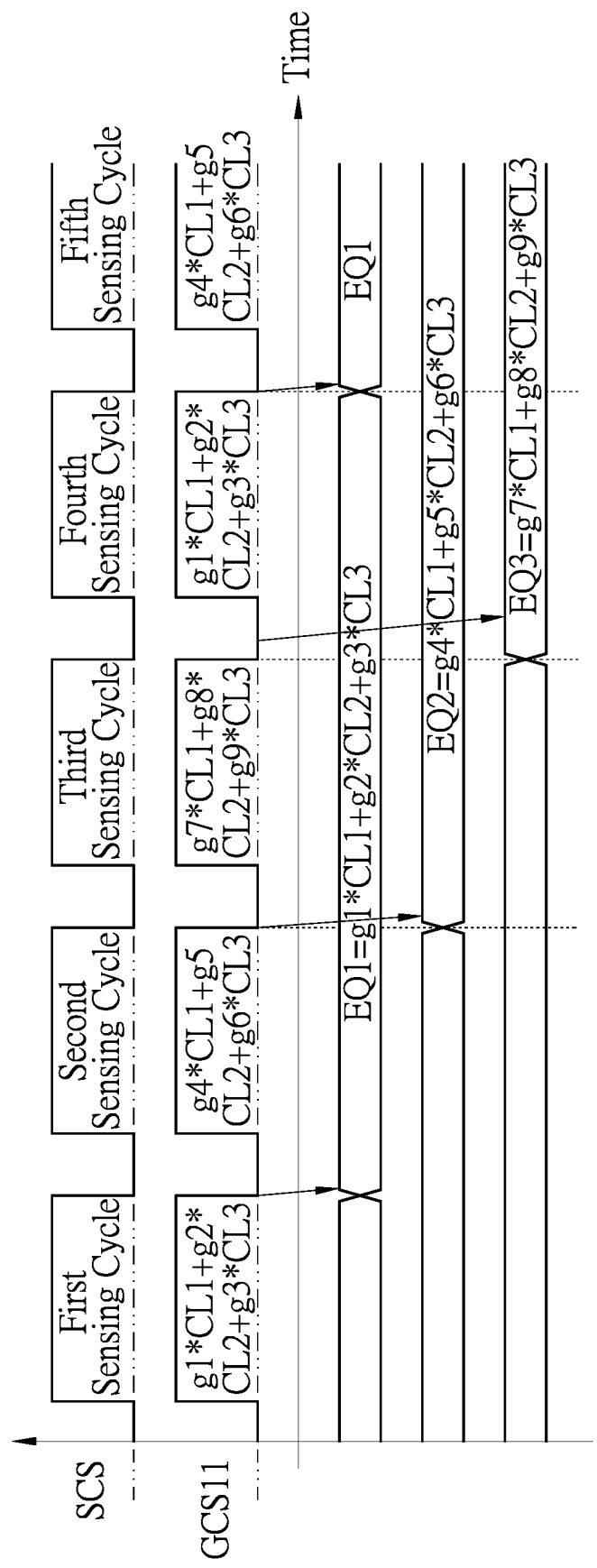
FIG. 9 is a waveform diagram of signals of the optical sensor having the common light sensing circuit for synchronously sensing the plurality of color light signals according to the fifth embodiment of the present disclosure.

Reference is made to FIGS. 8 and 9, in which FIG. 8 is a circuit diagram of an optical sensor having a common light sensing circuit for synchronously sensing a plurality of color light signals according to a fifth embodiment of the present disclosure, and FIG. 9 is a waveform diagram of signals of the optical sensor having the common light sensing circuit for synchronously sensing the plurality of color light signals according to the fifth embodiment of the present disclosure.

A difference between a first light sensing circuit 1011 as shown in FIG. 8 and the first light sensing circuit 101 as shown in FIG. 6 is that, the first light sensing circuit 1011 as shown in FIG. 8 not only senses the first photocurrent CL1 generated by the first photoelectric component PD1 and the second photocurrent CL2 generated by the second photoelectric component PD2, but also senses the third photocurrent CL3 generated by the third photoelectric component PD3.

In the first sensing cycle among the plurality of sensing cycles of the sensing cycle signal SCS as shown in FIG. 9, the first gain amplifier GAN1 of the first light sensing circuit 1011 multiplies the first photocurrent CL1 by the first gain g1 to output the amplified photocurrent. In the first sensing cycle, the second gain amplifier GAN2 of the first light sensing circuit 1011 multiplies the second photocurrent CL2 by the second gain g2 to output the amplified photocurrent. In the first sensing cycle, the third gain amplifier GAN3 of the first light sensing circuit 1011 multiplies the third photocurrent CL3 by the third gain g3 to output the amplified photocurrent.

In the first sensing cycle, the arithmetic circuit ALT1 of the first light sensing circuit 1011 performs an addition operation of a first arithmetic signal GCS11 as shown in FIG. 9 to output the total amplified photocurrent signal. That is, the arithmetic circuit ALT1 of the first light sensing circuit 1011 performs the addition operation of the following first equation:

$$EQ1 = g1 \times CL1 + g2 \times CL2 + g3 \times CL3,$$

wherein EQ1 represents the total amplified photocurrent of the first equation generated by the first light sensing circuit 1011, g1 represents the first gain, g2 represents the second gain, g3 represents the third gain, CL1 represents the first photocurrent, CL2 represents the second photocurrent, and CL3 represents the third photocurrent.

In the second sensing cycle among the plurality of sensing cycles of the sensing cycle signal SCS as shown in FIG. 9, the first gain amplifier GAN1 of the first light sensing circuit 1011 multiplies the first photocurrent CL1 by the fourth gain g4 to output an amplified photocurrent. In the second sensing cycle, the second gain amplifier GAN2 of the first light sensing circuit 1011 multiplies the second photocurrent CL2 by a fifth gain g5 to output an amplified photocurrent. In the second sensing cycle, the third gain amplifier GAN3 of the first light sensing circuit 1011 multiplies the third photocurrent CL3 by a sixth gain g6 to output an amplified photocurrent.

In the second sensing cycle, the arithmetic circuit ALT1 of the first light sensing circuit 1011 performs an addition operation of the first arithmetic signal GCS11 as shown in FIG. 9 to output the total amplified photocurrent signal. That is, the arithmetic circuit ALT1 of the first light sensing circuit 1011 performs the addition operation of the following second equation:

$$EQ2 = g4 \times CL1 + g5 \times CL2 + g6 \times CL3,$$

wherein EQ2 represents the total amplified photocurrent of the second equation generated by the first light sensing circuit 1011, g4 represents the fourth gain, g5 represents the fifth gain, g6 represents the sixth gain, CL1 represents the first photocurrent, CL2 represents the second photocurrent, and CL3 represents the third photocurrent.

In the third sensing cycle among the plurality of sensing cycles of the sensing cycle signal SCS as shown in FIG. 9, the first gain amplifier GAN1 of the first light sensing circuit 1011 multiplies the first photocurrent CL1 by a seventh gain g7 to output an amplified photocurrent. In the third sensing cycle, the second gain amplifier GAN2 of the first light sensing circuit 1011 multiplies the second photocurrent CL2 by an eighth gain g8 to output an amplified photocurrent. In the third sensing cycle, the third gain amplifier GAN3 of the first light sensing circuit 1011 multiplies the third photocurrent CL3 by a ninth gain g9 to output an amplified photocurrent.

In the third sensing cycle, the arithmetic circuit ALT1 of the first light sensing circuit 1011 performs an addition operation of the first arithmetic signal GCS11 as shown in FIG. 9 to output the total amplified photocurrent signal. That is, the arithmetic circuit ALT1 of the first light sensing circuit 1011 performs the addition operation of the following third equation:

$$EQ3 = g7 \times CL1 + g8 \times CL2 + g9 \times CL3,$$

wherein EQ3 represents the total amplified photocurrent of the third equation generated by the first light sensing circuit 1011, g7 represents the seventh gain, g8 represents the eighth gain, g9 represents the ninth gain, CL1 represents the first photocurrent, CL2 represents the second photocurrent, and CL3 represents the third photocurrent.

Then, the first color light value calculator circuit EQC1 may subtract the first equation, the second equation and the third equation from each other to calculate each of the first photocurrent CL1 of the first color light signal, the second photocurrent CL2 of the second color light signal and the third photocurrent CL3 of the third color light signal. The first color light value calculator circuit EQC1 may further calculate light intensity of the first color light signal according to the first photocurrent CL1, may calculate light intensity of the second color light signal according to the second photocurrent CL2, and may calculate light intensity of the third color light signal according to the third photocurrent CL3.

Figure 10:
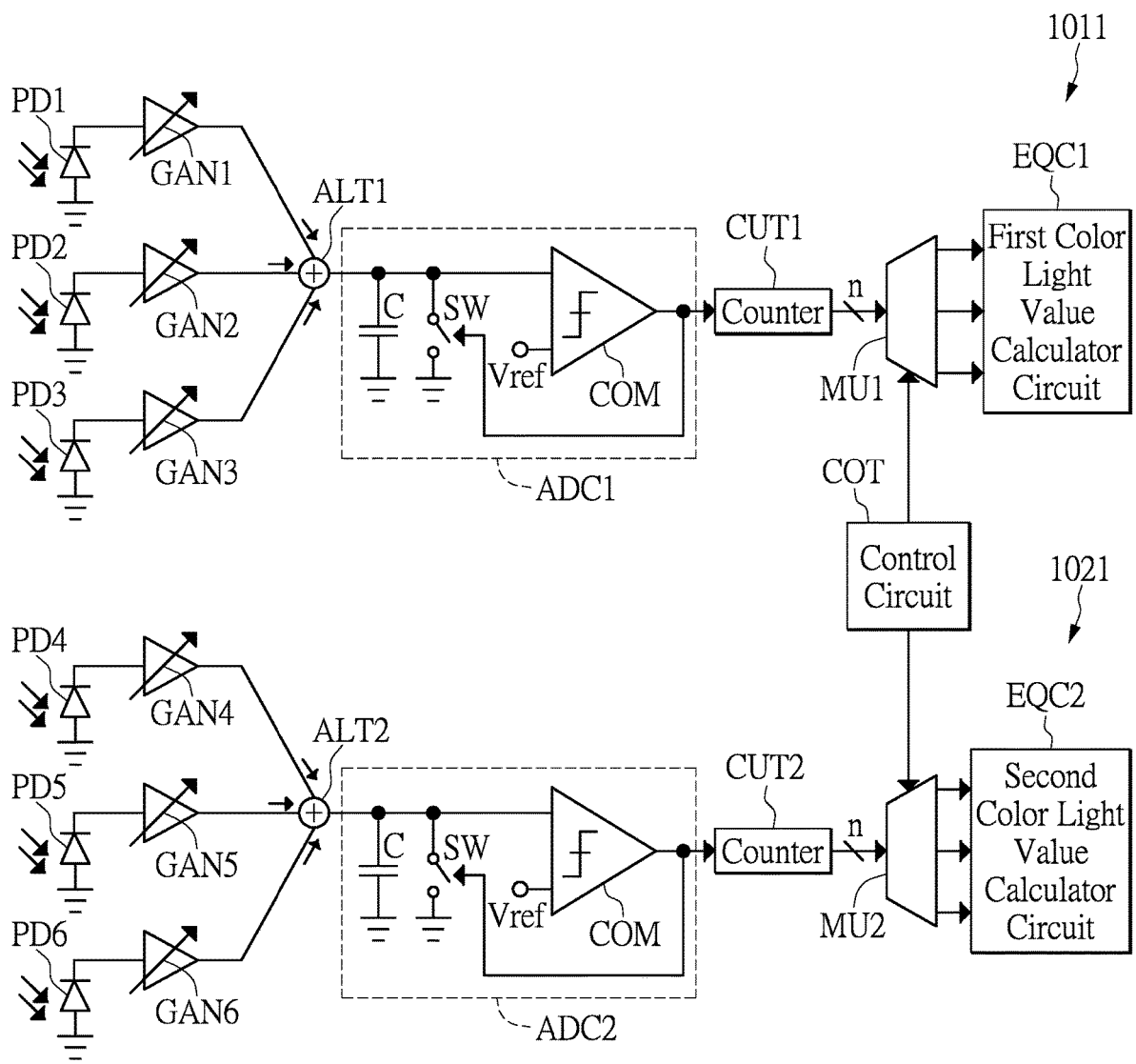
FIG. 10 is a circuit diagram of an optical sensor having a common light sensing circuit for synchronously sensing a plurality of color light signals according to a sixth embodiment of the present disclosure.
Figure 11:
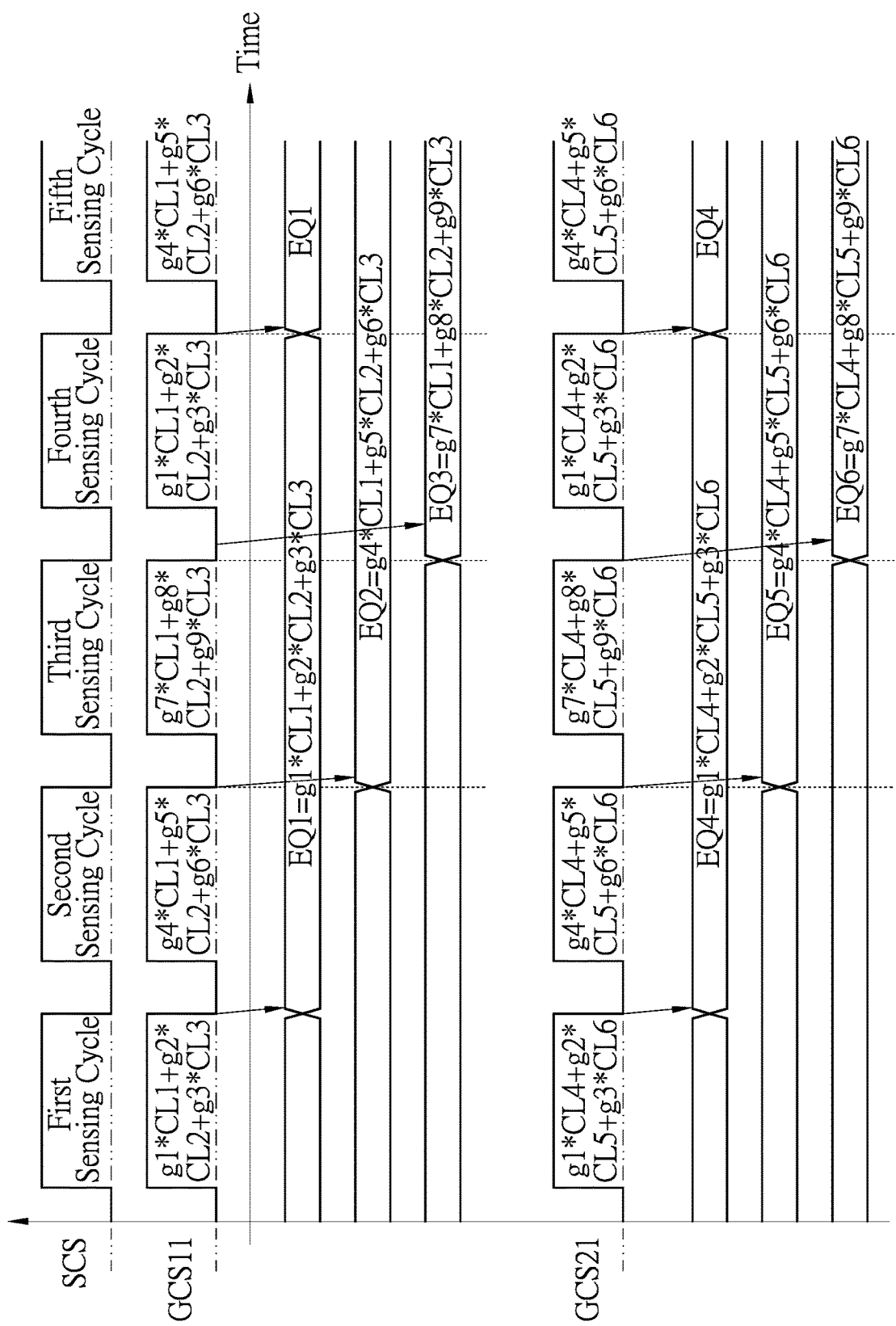
FIG. 11 is a waveform diagram of signals of the optical sensor having the common light sensing circuit for synchronously sensing the plurality of color light signals according to the sixth embodiment of the present disclosure.

Reference is made to FIGS. 10 and 11, in which FIG. 10 is a circuit diagram of an optical sensor having a common light sensing circuit for synchronously sensing a plurality of color light signals according to a sixth embodiment of the present disclosure, and FIG. 11 is a waveform diagram of signals of the optical sensor having the common light sensing circuit for synchronously sensing the plurality of color light signals according to the sixth embodiment of the present disclosure.

The first light sensing circuit 1011 of the sixth embodiment is the same as that of the fifth embodiment and thus is not repeated herein. A difference between the sixth and fifth embodiments is that, the common light sensing circuit of the optical sensor of the sixth embodiment of the present disclosure further includes a second light sensing circuit 1021 as shown in FIG. 10.

The second light sensing circuit 1021 performs operations that are substantially the same as that of the first light sensing circuit 1011. A difference between the second light sensing circuit 1021 and the first light sensing circuit 1011 is that, the second light sensing circuit 1021 and the first light sensing circuit 1011 sense different color light signals.

The fourth photoelectric component PD4 converts the fourth color light signal into the fourth photocurrent CL4. The fifth photoelectric component PD5 converts a fifth color light signal into the fifth photocurrent CL5. The sixth photoelectric component PD6 converts a sixth color light signal into the sixth photocurrent CL6. The second light sensing circuit 1021 senses the fourth photocurrent CL4, the fifth photocurrent CL5 and the sixth photocurrent CL6 at the same time.

In the embodiment, the sixth color light signal, the fifth color light signal, the fourth color light signal, the third color light signal, the second light signal and the first color light signal are six different light signals.

In the first sensing cycle among the plurality of sensing cycles of the sensing cycle signal SCS as shown in FIG. 11, the fourth gain amplifier GAN4 of the second light sensing circuit 1021 multiplies the fourth photocurrent CL4 by the first gain g1 to output an amplified photocurrent. In the first sensing cycle, the fifth gain amplifier GAN5 of the second light sensing circuit 1021 multiplies the fifth photocurrent CL5 by the second gain g2 to output an amplified photocurrent. In the first sensing cycle, the sixth gain amplifier GAN6 of the second light sensing circuit 1021 multiplies the sixth photocurrent CL6 by the third gain g3 to output an amplified photocurrent.

In the first sensing cycle, the arithmetic circuit ALT2 of the second light sensing circuit 1021 performs an addition operation of a second arithmetic signal GCS21 as shown in FIG. 11 to output the total amplified photocurrent signal. That is, the arithmetic circuit ALT2 of the second light sensing circuit 1021 performs the addition operation of the following fourth equation:

$$EQ4 = g1 \times CL4 + g2 \times CL5 + g3 \times CL6,$$

wherein EQ4 represents the total amplified photocurrent of the fourth equation generated by the second light sensing circuit 1021, g1 represents the first gain, g2 represents the second gain, g3 represents the third gain, CL4 represents the fourth photocurrent, CL5 represents the fifth photocurrent, and CL6 represents the sixth photocurrent.

In the second sensing cycle among the plurality of sensing cycles of the sensing cycle signal SCS as shown in FIG. 11, the fourth gain amplifier GAN4 of the second light sensing circuit 1021 multiplies the fourth photocurrent CL4 by the fourth gain g4 to output the amplified photocurrent. In the second sensing cycle, the fifth gain amplifier GAN5 of the second light sensing circuit 1021 multiplies the fifth photocurrent CL5 by the fifth gain g5 to output an amplified photocurrent. In the second sensing cycle, the sixth gain amplifier GAN6 of the second light sensing circuit 1021 multiplies the sixth photocurrent CL6 by the sixth gain g6 to output an amplified photocurrent.

In the second sensing cycle, the arithmetic circuit ALT2 of the second light sensing circuit 1021 performs an addition operation of the second arithmetic signal GCS21 as shown in FIG. 11 to output the total amplified photocurrent signal. That is, the arithmetic circuit ALT2 of the second light sensing circuit 1021 performs the addition operation of the following fifth equation:

$$EQ5 = g4 \times CL4 + g5 \times CL5 + g6 \times CL6,$$

wherein EQ5 represents the total amplified photocurrent of the fifth equation generated by the second light sensing circuit 1021, g4 represents the fourth gain, g5 represents the fifth gain, g6 represents the sixth gain, CL4 represents the fourth photocurrent, CL5 represents the fifth photocurrent, and CL6 represents the sixth photocurrent.

In the third sensing cycle among the plurality of sensing cycles of the sensing cycle signal SCS as shown in FIG. 11, the fourth gain amplifier GAN4 of the second light sensing circuit 1021 multiplies the fourth photocurrent CL4 by the seventh gain g7 to output an amplified photocurrent. In the third sensing cycle, the fifth gain amplifier GAN5 of the second light sensing circuit 1021 multiplies the fifth photocurrent CL5 by an eighth gain g8 to output an amplified photocurrent. In the third sensing cycle, the sixth gain amplifier GAN6 of the second light sensing circuit 1021 multiplies the sixth photocurrent CL6 by the ninth gain g9 to output an amplified photocurrent.

In the third sensing cycle, the arithmetic circuit ALT2 of the second light sensing circuit 1021 performs an addition operation of the second arithmetic signal GCS21 as shown in FIG. 11 to output the total amplified photocurrent signal. That is, the arithmetic circuit ALT2 of the second light sensing circuit 1021 performs the addition operation of the following sixth equation:

$$EQ6 = g7 \times CL4 + g8 \times CL5 + g9 \times CL6,$$

wherein EQ6 represents the total amplified photocurrent of the sixth equation generated by the second light sensing circuit 1021, g7 represents the seventh gain, g8 represents the eighth gain, g9 represents the ninth gain, CL4 represents the fourth photocurrent, CL5 represents the fifth photocurrent, and CL6 represents the sixth photocurrent.

Then, the second color light value calculator circuit EQC2 may subtract the fourth equation, the fifth equation and the sixth equation from each other to calculate each of the fourth photocurrent CL4 of the fourth color light signal, the fifth photocurrent CL5 of the fifth color light signal and the sixth photocurrent CL6 of the sixth color light signal. The second color light value calculator circuit EQC2 may further calculate light intensity of the fourth color light signal according to the fourth photocurrent CL4, may calculate light intensity of the fifth color light signal according to the fifth photocurrent CL5, and may calculate light intensity of the sixth color light signal according to the sixth photocurrent CL6.

[Beneficial Effects of the Embodiments]

In conclusion, the present disclosure provides the optical sensor having the common light sensing circuit for synchronously sensing the plurality of color light signals. The (common analog-to-digital converter of the) common light sensing circuit of the present disclosure is capable of continually sensing each of the plurality of color light signals in the plurality of sensing cycles. Therefore, an error is prevented from occurring in the sensed color light signals due to the sensed color light signals change with a change in a surrounding environment over time. It is worth noting that, the (common analog-to-digital converter of the) common light sensing circuit of the present disclosure is capable of synchronously sensing the plurality of color light signals in each of the plurality of sensing cycles. Therefore, a space occupied by the analog-to-digital converter circuit in the optical sensor and costs of the analog-to-digital converter circuit are reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical sensor having a common light sensing circuit for synchronously sensing a plurality of color light signals, comprising:
    a plurality of gain amplifiers, wherein input terminals of the plurality of gain amplifiers are respectively connected to a plurality of photoelectric components, the plurality of photoelectric components respectively convert the plurality of color light signals into a plurality of photocurrents, and the plurality of gain amplifiers amplify the plurality of photocurrents respectively by a plurality of gains to respectively output a plurality of amplified photocurrents;
    an arithmetic circuit connected to an output terminal of each of the plurality of gain amplifiers, configured to add up the plurality of amplified photocurrents to obtain a total amplified photocurrent, and configured to output a total amplified photocurrent signal according to the total amplified photocurrent;
    an analog-to-digital converter circuit including one or more common analog-to-digital converters connected to the arithmetic circuit, and each of the common analog-to-digital converters is configured to convert the total amplified photocurrent into a digital signal; and
    a counter circuit connected to the analog-to-digital converter circuit and configured to count bit values of the digital signal to output a counting signal;
    wherein the plurality of photoelectric components respectively output the plurality of photocurrents in each of a plurality of sensing cycles, and the plurality of gain amplifiers multiply the plurality of amplified photocurrents respectively by the plurality of gains in each of the plurality of sensing cycles.

2. The optical sensor according to claim 1, wherein each of the plurality of photoelectric components converts one of the plurality of color light signals into one of the plurality of photocurrents in each of the plurality of sensing cycles, and each of the plurality of gain amplifiers multiplies the one of the plurality of the photocurrents respectively by different ones of the plurality of gains in the plurality of sensing cycles.

3. The optical sensor according to claim 1, wherein the arithmetic circuit performs addition operations of a plurality of equations respectively in the plurality of sensing cycles to calculate the total amplified photocurrent of the plurality of amplified photocurrents of the plurality of color light signals in each of the plurality of sensing cycles, and each of the plurality of equations is represented by:

$$EQm = gi \times CLi + \ldots gj \times CLj,$$

wherein EQm represents the total amplified photocurrent of an mth one of the plurality of equations, j is an integer value being larger than or equal to 2, gi to gj respectively represent an ith one of the gains to an jth one of the gains, and CLi to CLj respectively represent an ith one of the plurality of photocurrents to an jth one of the plurality of photocurrents.

4. The optical sensor according to claim 3, wherein the counter circuit is connected to a color light value calculator circuit, the color light value calculator circuit is configured to substitute the total amplified photocurrent of each of the plurality of sensing cycles into one of the plurality of equations according to the counting signal, and the color light value calculator circuit is configured to subtract the plurality of equations from each other to calculate the photocurrent of each of the plurality of color light signals.

5. The optical sensor according to claim 1, wherein the arithmetic circuit includes one or more arithmetic operators, a number of the arithmetic operators is equal to a number of the common analog-to-digital converters, and if the number of the arithmetic operators is larger than one, each of a plurality of light sensing circuits includes some of the plurality of gain amplifiers, one of the plurality of arithmetic operators and one of the plurality of common analog-to-digital converters;
    wherein in each of the plurality of light sensing circuits, an output terminal of each of the plurality of gain amplifiers is connected to an input terminal of the arithmetic operator, an output terminal of the arithmetic operator is connected to an input terminal of the common analog-to-digital converter, and the arithmetic operator adds up the amplified photocurrents that are respectively outputted by some of the plurality of gain amplifiers to output the total amplified photocurrent signal to the common analog-to-digital converter.

6. The optical sensor according to claim 1, wherein the counter circuit includes one or more counters, a number of the counters is equal to the number of the common analog-to-digital converters;
    wherein, if the number of the counters is larger than one, the counters are respectively connected to the common analog-to-digital converters, and each of a plurality of light sensing circuits includes some of the plurality of gain amplifiers, one of the plurality of counters and one of the plurality of common analog-to-digital converters;
    wherein in each of the plurality of light sensing circuits, the counter counts the digital signal from the one of the plurality of common analog-to-digital converter to output the counting signal.

7. The optical sensor according to claim 6, further comprising:
    one or more multiplexers, a number of the multiplexers is equal to the number of the counters, and if the number of the multiplexers is larger than one, the multiplexers are respectively connected to the counters and each of the plurality of light sensing circuits further includes one of the plurality of multiplexers;

wherein, in each of the plurality of light sensing circuits, the counter counts the bit values of the digital signal from the analog-to-digital converter to output the counting signal in each of the plurality of sensing cycles, the multiplexer selects one of the counting signals that are respectively outputted in the plurality of sensing cycles, the multiplexer transmits the one of the counting signals from the counter to a color light value calculator circuit, and the color light value calculator circuit calculates light intensity of the plurality of color light signals according to the counting signal from the multiplexer.

8. The optical sensor according to claim 7, further comprising:

a control circuit connected to the one or more multiplexers and configured to control the one or more multiplexers to operate.

9. The optical sensor according to claim 1, further comprising:

a storing circuit connected to the counter circuit and configured to store the counting signal from the counter circuit.

10. The optical sensor according to claim 1, wherein each of the common analog-to-digital converters includes a comparator, a first input terminal of the comparator is connected to an output terminal of the arithmetic circuit, a second input terminal of the comparator is coupled to a reference voltage, an output terminal of the comparator is connected to the counter circuit, and the comparator compares the reference voltage with a voltage converted from the total amplified photocurrent of the total amplified photocurrent signal to output the digital signal to the counter circuit.

11. The optical sensor according to claim 10, wherein each of the common analog-to-digital converters further includes a capacitor, a first terminal of the capacitor is connected to the arithmetic circuit and the first input terminal of the comparator, a second terminal of the capacitor is grounded, the arithmetic circuit outputs the total amplified photocurrent signal to the capacitor to charge the capacitor, and the comparator compares a voltage of the capacitor with the reference voltage to output the digital signal.

12. The optical sensor according to claim 11, wherein each of the common analog-to-digital converters further includes a switch component, a first terminal of the switch component is connected to the first input terminal of the comparator, a second terminal of the switch component is grounded, and a control terminal of the switch component is connected to the output terminal of the comparator.

* * * * *